3,726,816
CATALYST SYSTEM FOR USE IN WATER-BLOWN FLEXIBLE POLYETHERURETHANE FOAMS AND FOAMS MADE THEREFROM

Hubert J. Fabris, Akron, Edwin M. Maxey, Kent, and Heinz Uelzmann, Cuyahoga Falls, Ohio, assignors to The General Tire & Rubber Company, Summit, Ohio
No Drawing. Continuation-in-part of application Ser. No. 53,269, July 8, 1970. This application Oct. 18, 1971, Ser. No. 190,276
Int. Cl. C08g 22/44, 22/36, 51/58
U.S. Cl. 260—2.5 AC
6 Claims

ABSTRACT OF THE DISCLOSURE

A novel catalyst system for use in water-blown flexible polyetherurethane foams combines quaternary ammonium bases with a delayed action neutralizing composition which does not release free acid, thereby producing a foam having low residual odor that retains its original or near-original compression load strength, even when subjected to severe heat aging conditions.

CROSS-REFERENCE TO RELATED APPLICATION

This application is a continuation-in-part of U.S. patent application Ser. No. 53,269, filed July 8, 1970, now abandoned.

BACKGROUND OF THE INVENTION

This invention relates to the field of polyurethane chemistry. More particularly, this invention relates to water-blown flexible polyetherurethane foams and to catalysts and other reagents used therewith.

The art of making polyurethane foams is widely known and well developed. These foams may be made rigid, semi-rigid and flexible in densities ranging from less than one pound to greater than 50 pounds per cubic foot. Polyurethane foams have a wide variety of uses, such as in cushions, bedding, fabric backing and crash pads. Generally speaking, polyurethane foam is made by reacting a polyol or other compound containing labile hydrogen atoms with a polyisocyanate and other ingredients such as water, auxiliary blowing agents, catalysts and the like. The mixed ingredients develop into a cream and thereafter billow into a foam of uniform cell size to either fill a mold or produce a bun; the foam is usually thereafter cured with heat. A type of polyurethane foam, namely water-blown flexible polyether polyurethane foam, is the subject of this invention.

Presently, in the manufacture of water-blown flexible polyetherurethane foams organic amines are used as catalysts to control the reaction between the isocyanate groups and the water, which reaction forms urea structures and carbon dioxide, which is the real blowing agent for the foam. However, such organic amines in the foam cause an undesirable odor which carries through the curing cycle. This odor is sufficiently obnoxious to cause a reduction in consumer acceptance of certain foam articles such as bedding and cushions.

The prior art has sought to substitute other catalysts having less odor, such as strong bases, which are widely known to increase the reaction rate of the isocyanate-water reaction, but these compounds create other problems. For instance, although it is known that quaternary ammonium bases, such as tetramethyl ammonium hydroxide and trimethyl benzyl ammonium methoxide, are extremely good catalysts for the urea-forming and carbon dioxide-forming (blowing) reactions, their presence in the cured foam causes scission of urethane bonds and generally degrades the physical properties of the foam. The base can be neutralized to prevent this foam deterioration. However, mere mixing with an acid would cause neutralization before the base had a chance to perform its catalytic function. The neutralization must come after the base has completed its catalytic role. Certain organic halides have been used previously because they liberated hydrogen halides by beta elimination at temperatures of 150° C. and higher, but such temperatures are seldom reached in normal flexible polyetherurethane foam production.

SUMMARY OF THE INVENTION

This invention comprises a low odor catalyst system for use in the manufacture of water-blown flexible polyetherurethane foams comprising tin carboxylate, a quaternary ammonium base and an effective amount of a composition selected from the group consisting of (a) organic chlorides in which there is a chlorine atom on an alpha carbon to a group selected from the class consisting of an ether oxygen atom, a thioether sulfur atom, the carbonyl, sulfonyl, phosphoryl and phenyl groups, vinylene groups containing no hydrogen atom beta to the chlorinated carbon atom and ethinylene groups, (b) alkyl diesters formed from alcohols containing 1 to 8 carbon atoms and dicarboxylic acids selected from the class consisting of oxalic, maleic and fumaric acids, and (c) aromatic monohalides activated by at least one electron-withdrawing group ortho or para to the halogen atom, said composition capable of neutralizing said base only by nucleophilic substitution.

This invention is based upon the discovery that the subject compositions react at temperatures below 150° C. by simple substitution without liberation of any acid in contact with quaternary ammonium base catalysts in the foam matrix and effectively neutralize the base after curing of the foam and before degradation would normally begin. Using these compounds there is produced a low-odor flexible polyetherurethane foam that retains its physical properties, such as compression load strength, upon heat aging.

Therefore, the main object of this invention is a low-odor catalyst system for use in the manufacture of water-blown flexible polyetherurethane foams that provide retained compression load strength in the cured foam. Other objects include providing a catalyst system that has a low residual odor, that will remove the degradation aspect of alkali-based catalysts and that provides relatively independent control of the urea-forming and urethane-forming reactions, and providing a water-blown flexible polyether-urethane foam made therefrom which does not have persistent undesirable amine-type odors and which retains its compression load strength upon heat aging.

DESCRIPTION OF THE PREFERRED EMBODIMENT

This invention concerns water-blown flexible polyetherurethane foams. These foams are generally made by reacting a polyisocyanate, water and a polyether polyol in contact with catalysts and surface active agents. Other ingredients may optionally be added such as auxiliary blowing agents, fillers, flame retardants and dyes. A complex series of reactions is involved. Generally, the polyether polyol, e.g. diol, triol and/or tetrol, reacts with some of the polyisocyanate to form a chain-extended polyurethane while some of the isocyanate reacts with the water to form carbamic acid that breaks down to form a primary amine and carbon dioxide. The carbon dioxide together with any auxiliary blowing agents, such as fluorocarbons, expand the polyurethane into a cellular structure or foam, and the primary amine formed from the polyisocyanate-water reaction reacts with further polyisocyanate to form a di-substituted urea which in turn reacts with more isocyanate to form cross-linking biuret structures.

The polyetherurethane foams of this invention are known as "flexible" foams as opposed to "semi-rigid" and "rigid" foams. The flexibility of these foams is not specifically definable because the formulation may be changed incrementally to provide an incremental increase or decrease in the flexibility of the foam. This situation is known in the art and persons skilled therein realize that there is a rather gray area between the exact definition of a "flexible" and "semi-rigid" foam. As used herein, the term "flexible" will denote the type of polyetherurethane foam that is considered flexible by those skilled in the art and as described in the literature, viz. Polyurethanes, B. A. Dombrow, Reinhold Publishing Corporation, New York (1965).

A wide range of polyether polyols, such as diols, triols and tetrols, can be used in making water-blown flexible polyetherurethane foams. Polyether diols are generally made by reacting an alkylene oxide such as propylene oxide with a strong base such as potassium hydroxide.

Polyethers having a highly branched chain network are also useful. Such highly branched chain polyethers are readily prepared from alkylene oxides and intiators having a funtcionality greater than two. Highly branched polyethers have the advantage of making possible cross-linking without the interaction of urea or urethane groups with the isocyanate groups. This has the advantage of making a larger proportion of the isocyanate used available for the evolution of carbon dioxide and of reducing the overall amount of isocyanate that is required in the preparation of the foamed polymer.

The higher functional initiators that are useful with the alkylene oxides includes polyols, polyamines and amino alcohols having a total of three or more reactive hydrogen atoms on hydroxyl and primary or secondary amino gorups. Suitable polyols include triols, such as glycerol, trimethylolpropane, butanetriols, hexanetriols, trimethylolphenol, tris (hydroxyphenyl) propane, tris (hydroxyxylyl) propane, novolaks and trialkanolamines; various tetrols, such as erythritol and pentaerythritol; pentols; hexols, such a dipentaerythritol and sorbitol; alkyl glucosides; carbohydrates; polyhydroxy fatty acid esters such as castor oil; and polyoxyalkylated derivatives or polyfunctional compounds having three or more reactive hydrogen atoms, such as, for example, the reaction product of trimethylolpropane, glycerol and other polyols with ethylene oxide, propylene oxide or other epoxides or copolymers thereof, e.g., copolymers of ethylene and propylene oxides. Higher functional amino alcohols and polyamines include, by way of example, ethanolamine, diethanolamine, triethanolamine, isopropanolamine, diisopropanolamine, triisopropanolamine, 2-(2 - amino-ethylamino)ethanol, 2-amino-2-(hydroxymethyl)-1,3-propanediol, diethylenetriamine, triethylenetetramine, urea and urea-formaldehyde polymers as well as various aryl polyamines, such as 4,4',4''-methylidynetrianiline.

Another means of increasing the degree of branching, if desired, when employing linear polyethers, is to include one or more highly functional initiators in the mixture prepared for reaction.

Preferred polyethers of the branched type are those prepared by adding propylene oxide to various diols, triols, tetrols and polyols as starters to produce adducts of various molecular weights. Polyethers which deserve special mention are the 1,2,6-hexanetriol and glycerol adducts of propylene oxide having molecular weights of 1000 to 6000.

The amount of highly functional initiator normally employed with the linear type polyethers described above is an amount in the range of from 0.5 to 6.0 percent by weight of said initiator based on the weight of polyether charged to the reaction.

Generally, the polyethers suitable for employment can be conveniently characterized as normally liquid (although meltable solid polyethers are not excluded), pourable polyethers having viscosities in the range of from 50 centipoises to about 500,000 centipoises at room temperature (i.e., 25° C.) and having preferably molecular weights in the range of from 1000 to about 10,000.

A wide variety of polyisocyanate compounds can be used in the polyurethane reaction. Examples of some of these include:

toluene-2,4-diisocyanate;
toluene-2,6-diisocyanate;
1,5-naphthalenediisocyanate;
cumene-2,4-diisocyanate;
4-methoxy-1,3-phenylenediisocyanate;
4-chloro-1,3-phenylenediisocyanate;
4-bromo-1,3-phenylenediisocyanate;
4-ethoxy-1,3-phenylenediisocyanate;
2,4'-diisocyanatodiphenylether;
5,6-dimethyl-1,3-phenylenediisocyanate;
2,4-dimethyl-1,3-phenylenediisocyanate;
4,4'-diisocyanatodiphenylether;
4,6-dimethyl-1,3-phenylenediisocyanate;
9,10-anthracenediisocyanate;
4,4'-diisocyanatodibenzyl;
3,3'-dimethyl-4,4'-diisocyanatodiphenylmethane;
2,6-dimethyl-4,4'-diisocyanatodiphenyl;
2,4-diisocyanatostilbene;
3,3'-dimethyl-4,4'-diisocyanatodiphenyl;
3,3'-dimethoxy-4,4'-diisocyanatodiphenyl;
1,4-anthracenediisocyanate;
2,5-fluorenediisocyanate;
1,8-naphthalenediisocyanate;
2,6-diisocyanatobenzofuran; and
2,4,6-toluenetriisocyanate.

It is to be understood that mixtures of two or more of these polyisocyanates can be employed. Aromatic isocyanates are preferred, particularly the toluene diisocyanate isomers above.

Catalysts are added to accelerate the different reactions. The chain-extension reaction, in which the polyol reacts with the isocyanate to produce the polyurethane, is accelerated by tin carboxylates, with or without hydrocarbon groups attached to the tin, and the blowing reaction which was previously catalyzed by tertiary amines is catalyzed by quaternary ammonium bases in accordance with this invention. Examples of suitable tin carboxylates include dibutyl tin dilaurate, dibutyl tin di-2-ethyl hexoate, stannous octoate and stannous oleate.

The novel catalyst system of this invention permits more independent control over each of the subject reactions to provide greater latitude in formulation of the foams than previously possible. The quaternary ammonium bases catalyze the isocyanate-water reaction that forms urea structures and carbon dioxide and operates apparently independent of the catalysis involved in the isocyanate-hydroxyl reaction that produces the urethane linkages.

The quaternary ammonium bases which are neutralized in the practice of this invention include a number of different materials. The term "base" is used herein to define a material containing a hydroxide, alkoxide, aryloxide or aralkoxide group as the anion attached to the tetravalent nitrogen atom. The other organic groups attached to each nitrogen atom can be alkyl and alkenyl groups and substituted forms thereof in both linear and branched configurations, aralkyl groups of the same limitations and, in addition, can include one aryl group. When more than one aryl group is attached to a nitrogen atom, quaternization is rarely possible. These quaternary ammonium bases are known in the art as catalysts in polyurethane reactions, examples including quaternary ammonium hydroxides such as benzyltrimethylammonium hydroxide, trimethylcyclohexylammonium hydroxide (U.S. Pat. 3,108,975), tetramethylammonium hydroxide, trimethylphenylammonium hydroxide, tetraethylammonium hydroxide (U.S. Pat. 3,336,345) and heterocyclic quaternary ammonium hydroxides such as N-methylpyridinium hydroxide and morpholinium bases. Similarly, the corresponding alkoxides, aryloxides and aralkoxides are exemplified by benzyltrimethylammonium methoxide and ethoxide, tetramethylammonium phenoxide and tetramethylammonium benzoxide. Preferably, the alkoxide, aryloxide and aralkoxide groups contain no more than about 12 carbon atoms.

The quaternary ammonium bases used in making waterblown flexible polyurethane foams of this invention should be used in similar amounts as the tertiary amine catalysts are used; this is fully within the ambit of one skilled in the polyurethane art. Some of these quaternary ammonium bases are commercially available such as, for example, tetramethyl ammonium hydroxide which is available from Eastman Kodak Company as an alcohol solution which can be easily made into a water solution for use in the water-blown formulation by practices fully-known in the polyurethane chemistry art. Generally, the alcohol is stripped from the alcohol solution by simple heating and water is added back. Other quaternary ammonium bases can be easily prepared using existing laboratory procedures and recipes.

The quaternary ammonium base neutralizing composition of this invention is selected from the group consisting of (a) organic chlorides in which there is a chlorine atom on an alpha carbon to a group selected from the class consisting of ether oxygen atoms, thioether sulfur atoms, carbonyl, sulfonyl, phosphoryl and phenyl groups, vinylene groups containing no hydrogen atom beta to the chlorinated carbon and ethinylene groups, (b) alkyl diesters formed from alcohols containing 1 to 8 carbon atoms and dicarboxylic acids selected from oxalic, maleic and fumaric acids and (c) aromatic mono-halides activated by at least one electron-withdrawing group ortho or para to the halogen atom, said composition being capable of neutralizing the base by nucleophilic substitution.

Examples of group (a) organic chlorides in which there is a chlorine atom on an alpha carbon to various activating groups include bis(chloromethyl)ether, 3-bis-(chloromethyl)oxetane, chlorodimethylsulfide, $\alpha,\alpha'$-dichloro-dimethylsulfide, ethylene bis chloroacetate, 2-ethylhexyl chloroacetate, alpha-chloro-tert-butylacetates, alpha-chlorocyanoacetates, chloroacetone, chloronitromethane, alpha-chloro-dimethylsulfone, alpha,alpha-dichloro-dimethylsulfone, alpha-chlorodimethylsulfoxide, chloromethyl phosphonate, chloromethyl phenols, bis-(chloromethyl)phenols, benzyl chloride, diphenyldichloromethane, triphenylchloromethane, propargyl chloride, 1,4-dichlorobutine-2,3, 1,2,3-trichloropropene and 1,1-dichloro-2-methylpropene.

Examples of group (b) alkyl diesters include diethyl oxalate and di-n-butyl fumarate.

Examples of group (c) activated aromatic monohalides include 1-bromo-2-nitrobenzene, 1-chloro-2,4-dinitrobenzene, 1-chloro-2-nitrobenzene, 1-bromo-4-nitrobenzene and 1-chloro-4-nitrobenzene.

It is desirable, but not indispensable, that the base neutralizing composition be soluble in the foam-forming reactants. Soluble compositions are more easily blended in the formulations than dispersible ones; however, where needed, a dispersible composition can be used in lieu of a soluble one such as ethylene bis chloroacetate. Another aspect of the neutralizing composition is that it should not contain free acid. If some free acid is unavoidable, then the amount of quaternary ammonium base and polyisocyanate should be increased to compensate for it.

The tin carboxylate, the quaternary ammonium base and the quaternary ammonium base neutralizing composition can be mixed together prior to addition, added separately, or added in various combinations to various portions of the polyurethane reactants. There does not seem to be any difference in foam properties stemming from the addition procedure.

The amount of the base neutralizing composition in this invention depends upon the amount of quaternary ammonium base used. To be effective, the amount should be at or near the stoichiometric equivalent of the particular quaternary ammonium base. It has been found that a slight deficiency in the stoichiometric amount of the ester will function operatively and the resultant foam will attain the hereinbefore disclosed objects of the invention. It has also been found that a rather substantial stoichiometric excess, e.g. two to three times, of the ester may be used without apparent deleterious effect on the cured foam or its properties. Thus, the amount of neutralizing composition required is termed "an effective amount" and this will be recognized by those skilled in the urethane chemistry art to mean at or near the required stoichiometric amount and an excess of that amount where circumstances warrant.

The surface active agent, when used, stabilizes the cell structure during foam rise and prevents slumping, collapsing and ripping of the cells.

The following examples are intended to show one skilled in the art the best presently-known mode for practicing this invention as well as to show some of the meritorious aspects thereof and are not intended to limit this invention the scope of which is properly delineated in the appended claims. Unless otherwise noted, all parts are parts by weight per 100 parts of polyol and all percentages are percentages by weight.

EXAMPLES

A number of small samples of a typical water-blown flexible polyetheurethane foam were prepared by hand-mixing the reactants according to the recipes shown listed below in the table.

The basic foam ingredients for each sample were as follows:

| Ingredient: | Parts |
|---|---|
| 3000 mol. wt. polyoxypropylene triol | 100 |
| Toluene diisocyanate (a mixture of 2,4-toluene diisocyanate and 2,6-toluene diisocyanate in a ratio of 4:1) | 52 |
| A polyalkylene oxide polysiloxane surfactant | 1 |
| Water | 4 |
| Stannous octoate | 0.35 |

Amine or quaternary ammonium compounds and neutralizing agents were added as shown in the following Table I:

TABLE I

| Sample | Amine or quaternary ammonium compound | Parts | Neutralizing agent | Parts |
|---|---|---|---|---|
| A | Tetramethylbutane diamine and N-methyl morpholine. | 0.05 / 0.06 | | |
| B | Tetramethyl ammonium hydroxide. | 0.06 | | |
| C | do | 0.6 | Ethylene bis chloroacetate. | 0.5 |
| D | do | 0.6 | Benzyl chloride | 0.5 |
| E | do | 0.6 | Diethyl oxalate | 0.5 |
| F | do | 0.6 | do | 2 |
| G | do | 0.6 | di-n-Butylfumarate | 0.5 |
| H | do | 0.6 | do | 2 |
| J | Trimethylbenzyl ammonium methoxide. | 0.06 | | |
| K | do | 0.6 | Same as C | 0.5 |
| L | Tetramethylammonium phenoxide. | 0.6 | | |
| M | do | 0.6 | Same as C | 0.5 |
| N | Tetramethylammonium benzoxide. | 0.6 | | |
| O | do | 0.6 | Same as C | 0.5 |

For each sample the reactants were poured into a six inch diameter cardboard dairy container, permitted to foam, and then cured for 10 minutes at 250° F. and later one hour at 250° F. Each sample was tested for density, 25 percent compression load deflection (CLD) (ASTM T1564), and 65 percent compression load deflection, and then the samples were heat aged at 140° C. for 24 hours and the 25 percent CLD and 65 percent CLD retaken. The test results appear below in Table II.

TABLE II

| | Density (lb./cu. ft.) | CLD | | | |
|---|---|---|---|---|---|
| | | Original | | Aged | |
| | | 25% | 65% | 25% | 65% |
| Sample: | | | | | |
| A | 1.64 | 7.1 | 13.0 | 5.2 | 11.7 |
| B | 1.55 | 6.5 | 11.3 | (1) | (1) |
| C | 1.73 | 5.3 | 10.2 | 6.0 | 13.2 |
| D | 1.54 | 5.7 | 11.4 | 6.3 | 11.5 |
| E | 1.57 | 5.0 | 9.9 | 4.9 | 10.0 |
| F | 1.43 | 4.9 | 9.5 | 5.1 | 10.1 |
| G | 1.65 | 5.8 | 9.6 | 3.8 | 8.2 |
| H | 1.64 | 5.1 | 11.4 | 8.2 | 7.9 |
| J | 2.02 | 4.0 | 10.0 | (1) | (1) |
| K | 1.53 | 4.4 | 8.4 | 4.1 | 8.8 |
| L | 1.58 | 6.0 | 11.6 | (1) | (1) |
| M | 1.51 | 5.6 | 10.5 | 6.2 | 12.2 |
| N | 1.54 | 4.9 | 9.0 | (1) | (1) |
| O | 1.50 | 4.7 | 8.1 | 4.9 | 9.1 |

1 Foam completely disintegrated.

Sample A uses typical amine catalysts (tetramethyl butane diamine and N-methyl morpholine), and the resultant foam retains its 25/65 CLD upon aging, but this is the formulation of the prior art that exhibits the obnoxious amine odors. Sample B uses a known quaternary ammonium base in lieu of the amine catalysts (see Japanese patent application 11,153/69 and U.S. Pats. 3,042,632; 3,108,975; 3,226,345; and 3,235,518). Note that this foam distintegrates upon heat aging. Samples C–H show different base neutralizing compositions in combination with the tetramethyl ammonium hydroxide.

Samples B and C, J and K, L and M and N and O compare foams made with the four subgeneric types of quaternary ammonium bases alone and in the presence of a neutralizing composition. It is readily apparent that only operable results (a lasting foam) occur when a neutralizing composition is used.

We claim:
1. A self-neutralizing catalyst combination useful in making low odor polyetherurethane foams and comprising:
   (A) a quaternary ammonium base selected from the class consisting of quaternary ammonium hydroxides, alkoxides, aryloxides and aralkoxides and
   (B) a composition selected from the class consisting of
      (a) organic chlorides in which there is a chlorine atom on an alpha carbon to a group selected from the class consisting of an ether oxygen atom; a thioether sulfur atom; and the carbonyl, sulfonyl, and phenyl groups; vinylene groups containing no hydrogen atom beta to the chlorinated carbon atom; and ethinylene groups,
      (b) alkyl diesters formed from alcohols containing 1 to 8 carbon atoms and dicarboxylic acids selected from the class consisting of oxalic, maleic and fumaric acids,
      (c) aromatic mono-halides activated by at least one electron-withdrawing nitro group ortho or para to the halogen atom, and
      (d) alpha chlorodimethyl sulfoxide,
   said composition (B) being present in an effective amount sufficient to neutralize said quaternary ammonium base (A) at temperatures below 150° C. by nucleophilic substitution without liberation of any free acid.
2. A catalyst combination in accordance with claim 1 wherein said composition (B) is ethylene bis chloroacetate.
3. A low-odor catalyst combination for use in the manufacture of water-blown flexible polyetherurethane foams comprising the composition of claim 1 together with (C) a tin carboxylate.
4. A catalyst combination in accordance with claim 3 wherein said composition (B) is ethylene bis chloroacetate.
5. A method of increasing the heat aged strength and reducing the residual odor of water-blown flexible polyetherurethane foam catalyzed by a tin carboxylate and a quaternary ammonium base selected from the class consisting of quaternary ammonium hydroxides, alkoxides, aryloxides and aralkoxides, said method comprising adding to the unreacted reactants for said foam a composition (B) selected from the class consisting of
   (a) organic chlorides in which there is a chlorine atom on an alpha carbon to a group selected from the class consisting of an ether oxygen atom; a thioether sulfur atom; the carbonyl, sulfonyl, and phenyl groups; vinylene groups containing no hydrogen atom beta to the chlorinated carbon atoms; and ethinylene groups,
   (b) alkyl diesters formed from alcohols containing 1 to 8 carbon atoms and dicarboxylic acids selected from the class consisting of oxalic, maleic and fumaric acids,
   (c) aromatic mono-halides activated by at least one electron-withdrawing nitro group ortho or para to the halogen atom, and
   (d) alpha chlorodimethyl sulfoxide
said composition (B) being present in an effective amount to neutralize said quaternary ammonium base (A) at temperatures below 150° C. by nucleophilic substitution without liberation of any free acid and foaming the same.

6. A method in accordance with the method of claim 5 wherein said composition (B) is ethylene bis chloroacetate.

References Cited

UNITED STATES PATENTS

| | | | |
|---|---|---|---|
| 3,108,975 | 10/1963 | Lambert | 260—2.5 AC |
| 3,325,569 | 6/1967 | D'Alelio | 260—2.5 AJ |
| 3,067,149 | 12/1962 | Dombrow | 260—2.5 AJ |
| 3,067,150 | 12/1962 | Dombrow | 260—2.5 AJ |

FOREIGN PATENTS

| | | | |
|---|---|---|---|
| 900,392 | 7/1962 | Great Britain | 260—2.5 AB |
| 945,479 | 1/1964 | Great Britain | 260—2.5 BB |

OTHER REFERENCES

Chevassus et al.: Stabilization of Polyvinyl Chloride, Arnold, London, 1963, pp. 8–11.

DONALD E. CZAJA, Primary Examiner
C. W. IVY, Assistant Examiner

U.S. Cl. X.R.

252—426, 431 C; 260—2.5 BB

UNITED STATES PATENT OFFICE
CERTIFICATE OF CORRECTION

Patent No. 3,726,816         Dated   April 10, 1973

Inventor(s) Hubert J. Fabris, Edwin M. Maxey and Heinz Uelzmann

It is certified that error appears in the above-identified patent and that said Letters Patent are hereby corrected as shown below:

Column 3, line 34, which reads: "Polyurethanes" should read ---Polyurethanes---.

Column 3, line 57, which reads: "gorups" should read ---groups---.

Column 8, line 3, which reads: "and the carbonyl" should read ---the carbonyl---.

Column 8, line 72, which reads: "effective amount" should read ---effective sufficient amount---.

Signed and sealed this 20th day of November 1973.

(SEAL)
Attest:

EDWARD M. FLETCHER, JR.
Attesting Officer

RENE D. TEGTMEYER
Acting Commissioner of Patents